(12) United States Patent
Williams

(10) Patent No.: US 12,189,511 B2
(45) Date of Patent: Jan. 7, 2025

(54) APPARATUS AND METHOD FOR COLLECTING TRACE DATA

(71) Applicant: ARM LIMITED, Cambridge (GB)

(72) Inventor: Michael John Williams, Cambridge (GB)

(73) Assignee: Arm Limited, Cambridge (GB)

( * ) Notice: Subject to any disclaimer, the term of this patent is extended or adjusted under 35 U.S.C. 154(b) by 27 days.

(21) Appl. No.: 18/007,233

(22) PCT Filed: Aug. 2, 2021

(86) PCT No.: PCT/GB2021/051999
§ 371 (c)(1),
(2) Date: Jan. 27, 2023

(87) PCT Pub. No.: WO2022/029418
PCT Pub. Date: Feb. 10, 2022

(65) Prior Publication Data
US 2023/0289279 A1 Sep. 14, 2023

(30) Foreign Application Priority Data
Aug. 3, 2020 (GB) ...................................... 2012056

(51) Int. Cl.
*G06F 11/00* (2006.01)
*G06F 11/34* (2006.01)

(52) U.S. Cl.
CPC ........ *G06F 11/348* (2013.01); *G06F 2201/81* (2013.01); *G06F 2201/86* (2013.01); *G06F 2201/88* (2013.01)

(58) Field of Classification Search
None
See application file for complete search history.

(56) References Cited

U.S. PATENT DOCUMENTS

| 7,058,928 | B2 | 6/2006 | Wygodny et al. | |
|---|---|---|---|---|
| 8,776,029 | B2 | 7/2014 | Puthuff | |
| 2004/0078691 | A1 | 4/2004 | Cirne et al. | |
| 2006/0005083 | A1* | 1/2006 | Genden | G06F 11/3409 714/E11.2 |

(Continued)

OTHER PUBLICATIONS

Google Scholar/Patents search—text refined (Year: 2024).*

(Continued)

*Primary Examiner* — Christopher S McCarthy
(74) *Attorney, Agent, or Firm* — NIXON & VANDERHYE P.C.

(57) ABSTRACT

A data processing apparatus and method having processing circuitry, and trace circuitry having a trace buffer; write pointer storage, and a call depth counter, wherein the trace circuitry generates trace data processing first event activities: modify the call depth counter in a first direction, store first trace data indicative of the first event, and modify the write pointer to point to a next location in the trace buffer; in response to a second event, when the call depth counter is not equal to a threshold call depth, to: modify the call depth counter direction and the write pointer to point to a previous location in the trace buffer; and in response to the second event, when the call depth counter is equal to the threshold call depth, to store second trace data indicative of the second event in the trace buffer at the current location.

19 Claims, 9 Drawing Sheets

(56) References Cited

U.S. PATENT DOCUMENTS

Figure 1:
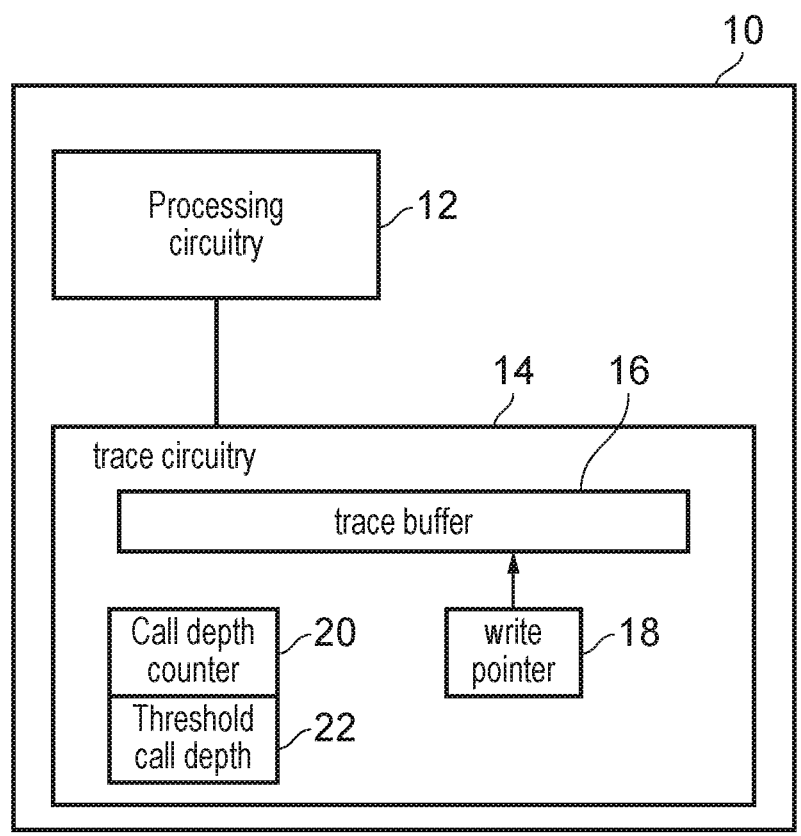

| | | |
|---|---|---|
| 2011/0138124 A1 | 6/2011 | Hill et al. |
| 2012/0246518 A1 | 9/2012 | Francis et al. |
| 2012/0311307 A1 | 12/2012 | Chynoweth et al. |
| 2013/0091387 A1 | 4/2013 | Bohnet et al. |
| 2016/0011922 A1 | 1/2016 | Torino |
| 2019/0065335 A1 | 2/2019 | Grant |

OTHER PUBLICATIONS

Adrien Verge, et al., "Hardware-assisted software event tracing", Concurrency and Computation: Practice and Experience, vol. 29, No. 10, May 25, 2017 (May 25, 2017), p. e4069, XP055633683, GB ISSN: 1532-0626, DOI: 10.1002/cpe.4069; the whole document.
Ruan De Clercq, et al., "A survey of hardware-based control flow integrity", Jun. 22, 2017 (Jun. 22, 2017), Jun. 22, 2017 (Jun. 22, 2017), XP055651627, Retrieved from the Internet: URL: https://arxiv.org/vc/arxiv/papers/1706/1706.07257vl.pdf [retrieved on Dec. 10, 2019] paragraphs [0005]-[0007].

* cited by examiner

122

| Time | Event | Call-depth counter | Underflow counter |
|---|---|---|---|
| T0 | Func_1() calls Func_2() | 0 | 0 |
| T1 | Func_2() calls Func_3() | 1 | 0 *|
| T2 | Trigger event occurs | 2 | 0 *|
| T3 | Func_3() calls Func_4() | 0 (reset) | 0 *|
| T4 | Return from Func_4 to Func_3 | 1 | 0 |
| T5 | Return from Func_3 to Func_2 | 0 | 0 |
| T6 | Func_2() calls Func_5() | 0 | 1 |
| T7 | Return from Func_5 to Func_2 | 1 | 1 |
| T8 | Return from Func_2 to Func_1 | 0 | 2 |
| T9 | Func_1() calls Func_5() | 1 | 2 *|
| T10 | Trigger event occurs | 0 (reset) | 0 (reset) |
| T11 | Return from Func_5 to Func_1 | 0 | 1 *|
| T12 | Func_1() calls Func_2() | 1 | 1 *|
| T13 | Func_2() calls Func_3() | 2 | 1 *|
| T14 | Func_3() calls Func_4() | 3 | 1 *|

124

| | Type | Time | From/value | To |
|---|---|---|---|---|
| L9 Top (newest) entry → | Call | T14 | Func_3 | Func_4 |
| L8 | Call | T13 | Func_2 | Func_3 |
| L7 | Call | T12 | Func_1 | Func_2 |
| L6 | Underflow | T11 | Count of 1 | - |
| L5 | Trigger | T10 | - | - |
| L4 | Call | T9 | Func_1 | Func_5 |
| L3 | Underflow | T8 | Count of 2 | - |
| L2 | Trigger | T2 | - | - |
| L1 | Call | T1 | Func_2 | Func_3 |
| L0 Bottom (oldest) entry → | Call | T0 | Func_1 | Func_2 |

128

| | | | Func_4 |
| | | Func_5 | Func_3 |
| Func_3 | | Func_1 | Func_2 |
| Func_2 | | | |
| T2 | | T10 | Current |
| Trigger | | | |

FIG. 7

APPARATUS AND METHOD FOR COLLECTING TRACE DATA

This disclosure relates to the generation of trace data indicative of processing activities.

Trace data comprises a series of data items indicative of processing activities of a data processing apparatus. Typically trace data is collected in a trace buffer which may be a dedicated memory for storing trace data or a mapped region of system memory. A usage model for a trace buffer is a circular buffer to which trace data is continually written at a location determined by a write pointer which advances through the trace buffer as the trace data is written. When the write pointer reaches the end of the buffer it wraps around to the beginning of the buffer. In this way trace data is continually recorded. It is also common for the system to stop collecting trace data on a trigger event. It is possible for this stop to occur: immediately on the trigger, so that trace before the trigger can be retrieved; when the write pointer wraps back around to the point of the trigger, so that trace data after the trigger is collected; or somewhere in between, so that trace data around the trigger is collected.

It is often desirable to store trace data relating to every branch taken by a data processing apparatus. In this way, the call return stack can be reconstructed and, using this information, a sequence of instructions which have been executed before, around, or after the trigger can be reconstructed. However, when the data associated with a number of branches becomes larger than the size of the buffer, it is only the top of the call return stack that is stored. Hence, it is not possible to reconstruct the full call return stack.

At least one embodiment of the present disclosure provides a data processing apparatus comprising: processing circuitry to process instructions; and trace circuitry comprising: a trace buffer; write pointer storage to store a write pointer to indicate a current location in the trace buffer; and a call depth counter to indicate a number of events, wherein the trace circuitry is configured to generate trace data indicative of processing activities of the processing circuitry, and in response to a first event to: modify the call depth counter in a first direction, store first trace data indicative of the first event in the trace buffer at the current location, and modify the write pointer to point to a next location in the trace buffer; and in response to a second event, when the call depth counter is not equal to a threshold call depth, to: modify the call depth counter in a second direction and modify the write pointer to point to a previous location in the trace buffer, and wherein the trace circuitry is responsive to a trigger event to reset a difference between the call depth counter and the threshold call depth.

At least one embodiment of the present disclosure provides a method of storing trace data in a trace buffer comprising: processing instructions; generating the trace data indicative of the processing; in response to a first event: modifying a call depth counter in a first direction; storing first trace data indicative of the first event in the trace buffer at a current location defined by a write pointer; and modifying the write pointer to point to a next location in the trace buffer; and in response to a second event and when the call depth counter is not equal to a threshold call depth: modifying the call depth counter in a second direction; and modifying the write pointer to point to a previous location in the trace buffer, and resetting, in response to a trigger event, a difference between the call depth counter and the threshold call depth.

At least one embodiment of the present disclosure provides a data processing apparatus comprising: means for storing trace data; means for processing instructions; means for generating the trace data indicative of processing activities of the means for processing; means for, in response to a first event: modifying a call depth counter in a first direction; storing first trace data indicative of the first event in the means for storing trace data at a current location defined by a write pointer; and modifying the write pointer to point to a next location in the means for storing trace data; and means for, in response to a second event and when the call depth counter is not equal to a threshold call depth: modifying the call depth counter in a second direction; and modifying the write pointer to point to a previous location in the means for storing trace data, and means for resetting, in response to a trigger event, a difference between the call depth counter and the threshold call depth.

Figure 2:
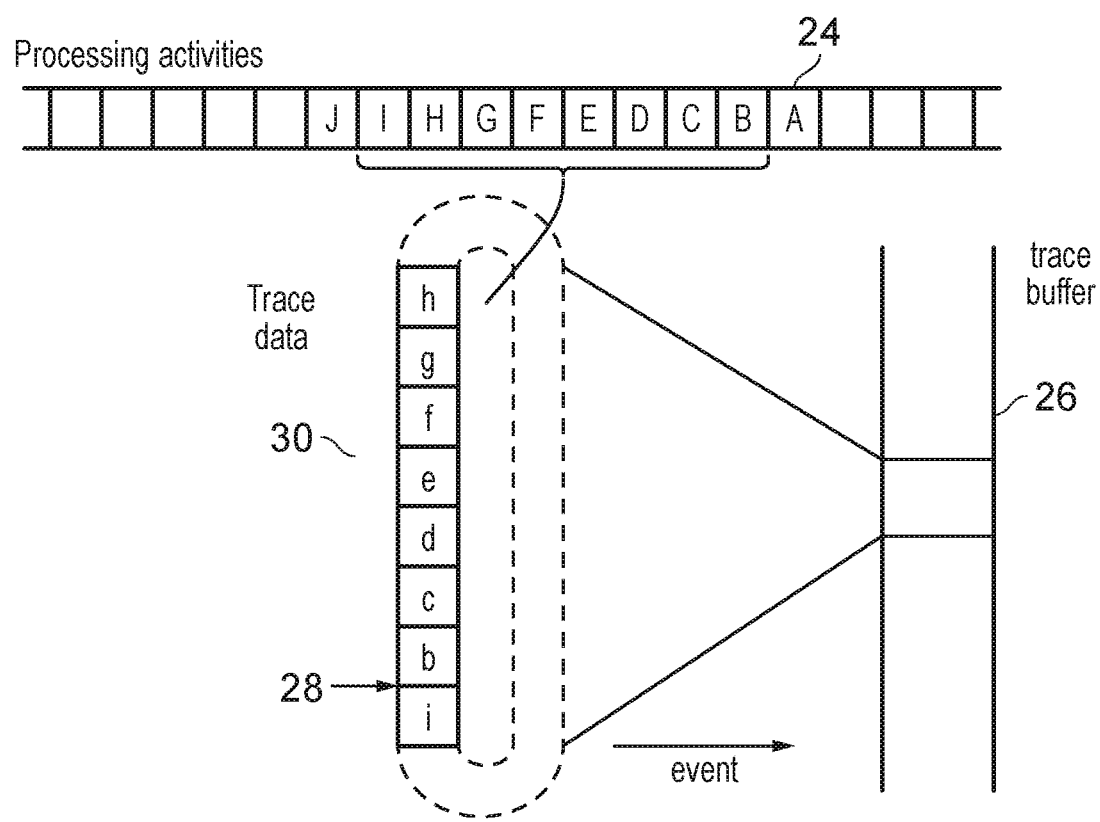
Figure 3:
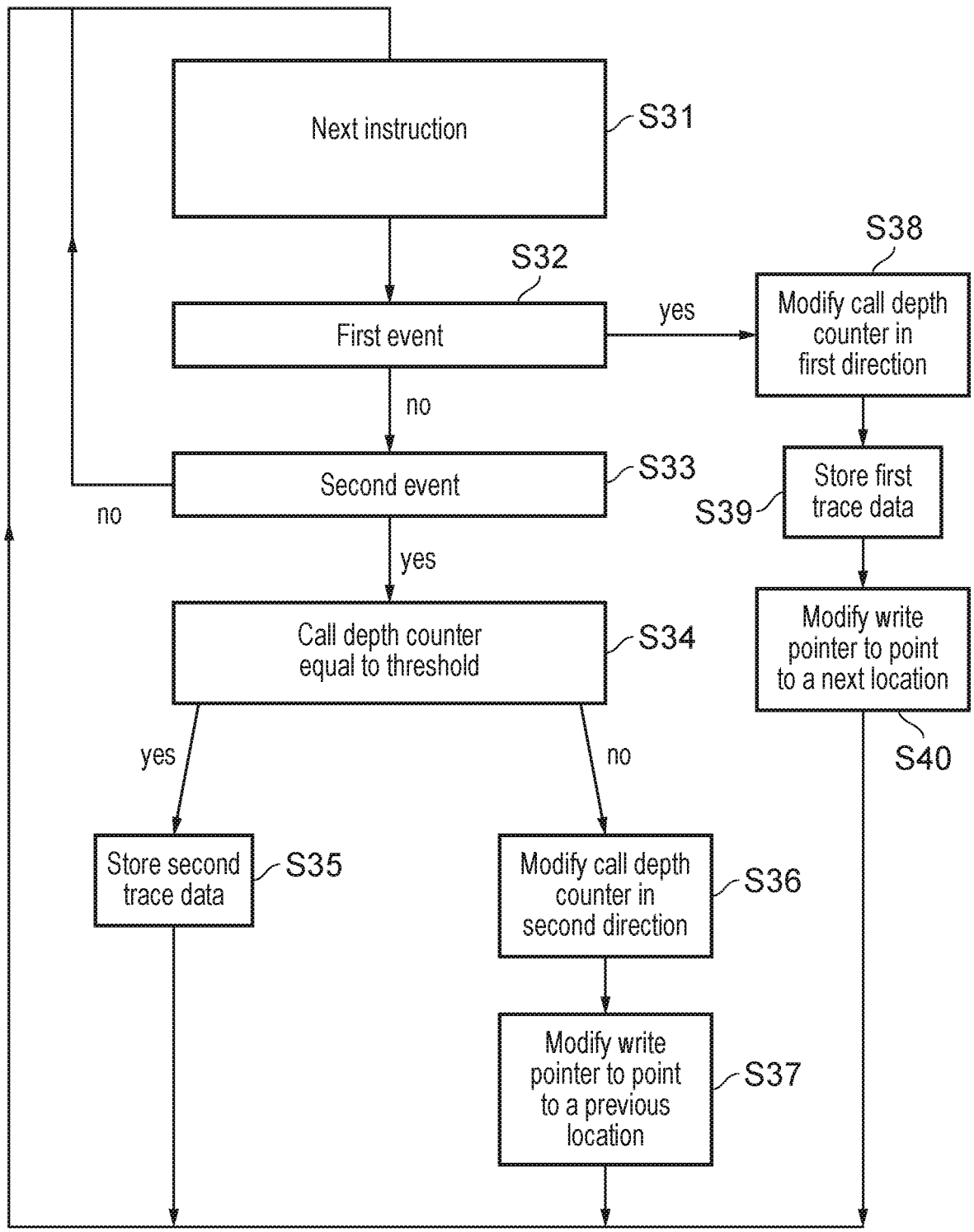
Figure 4:
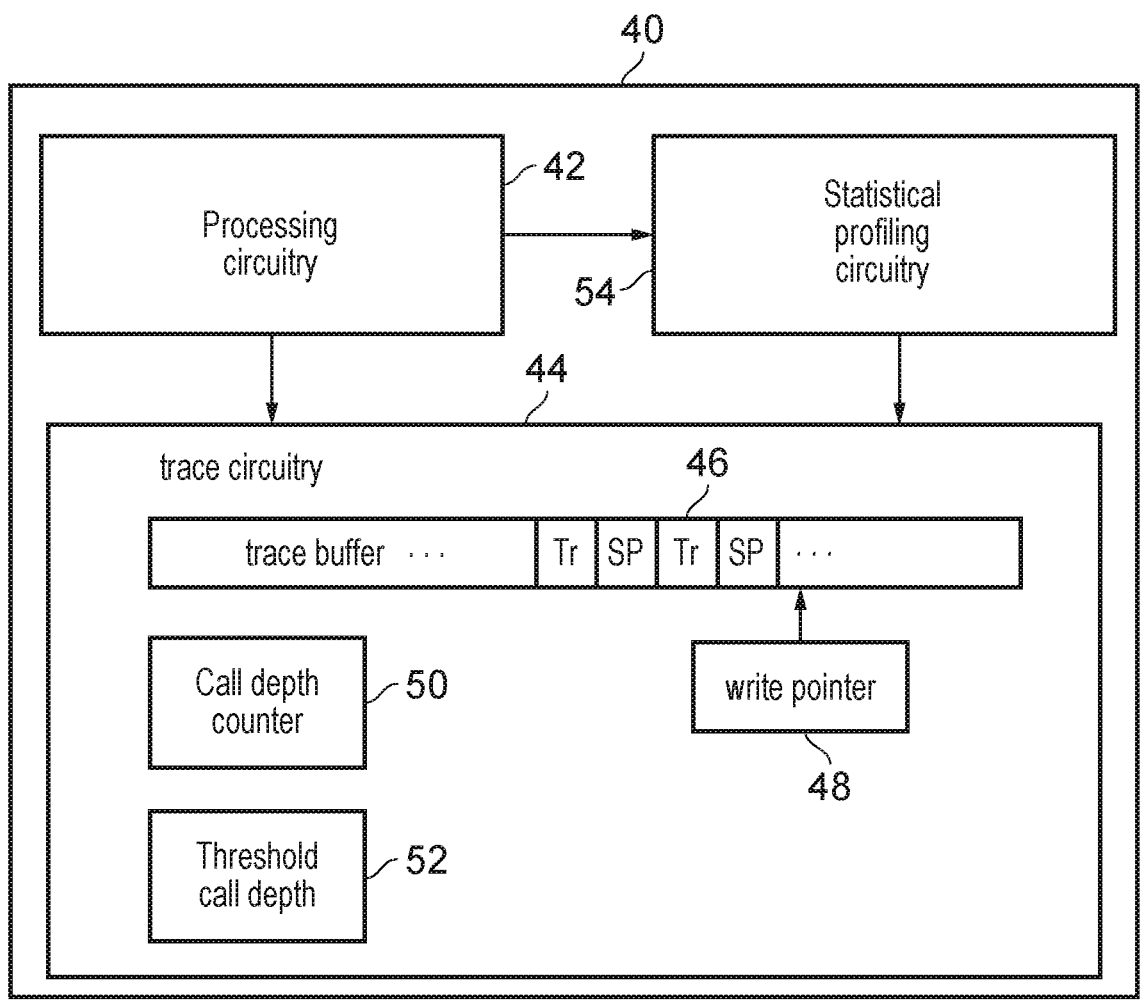
Figure 5:
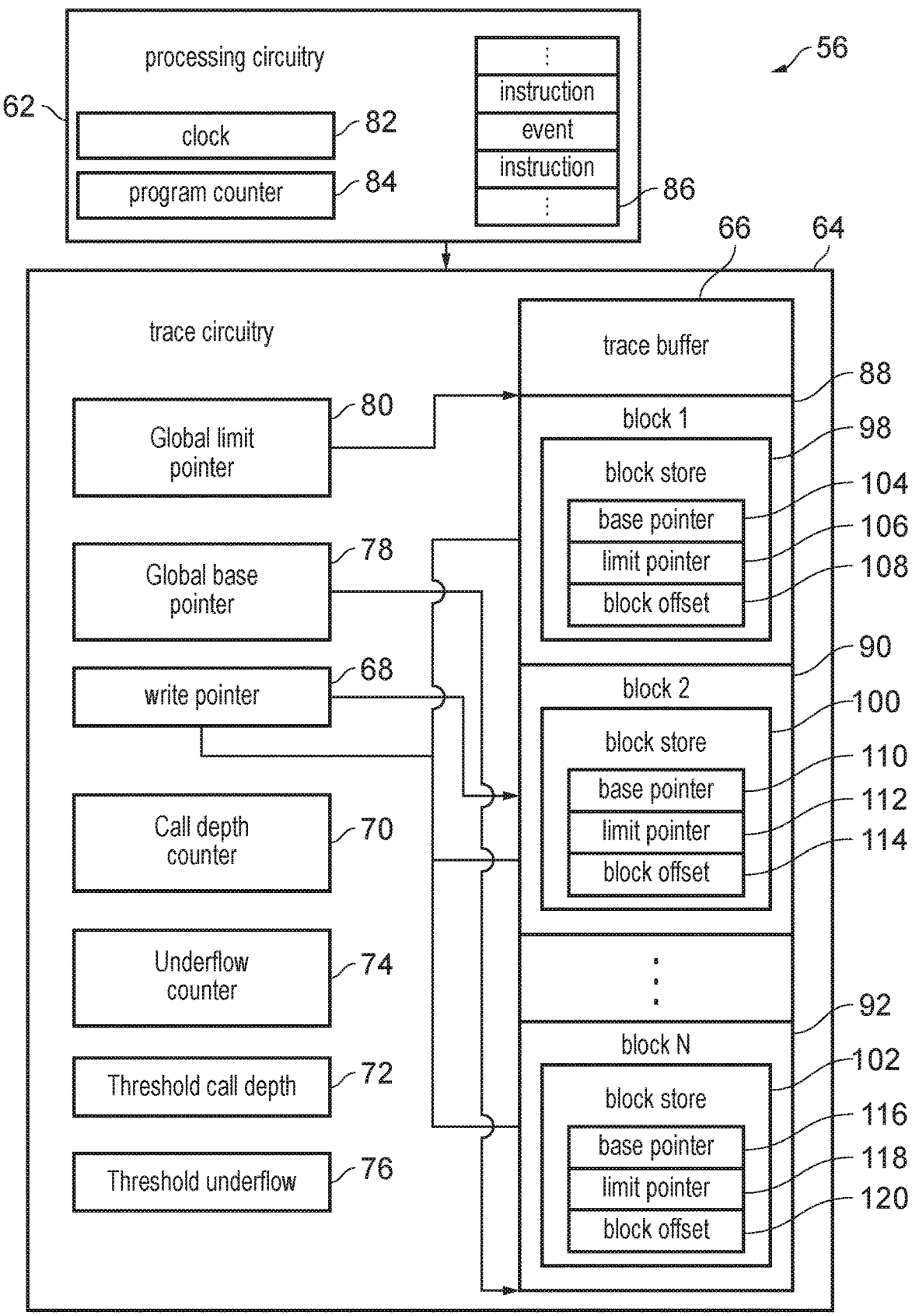
Figure 6:
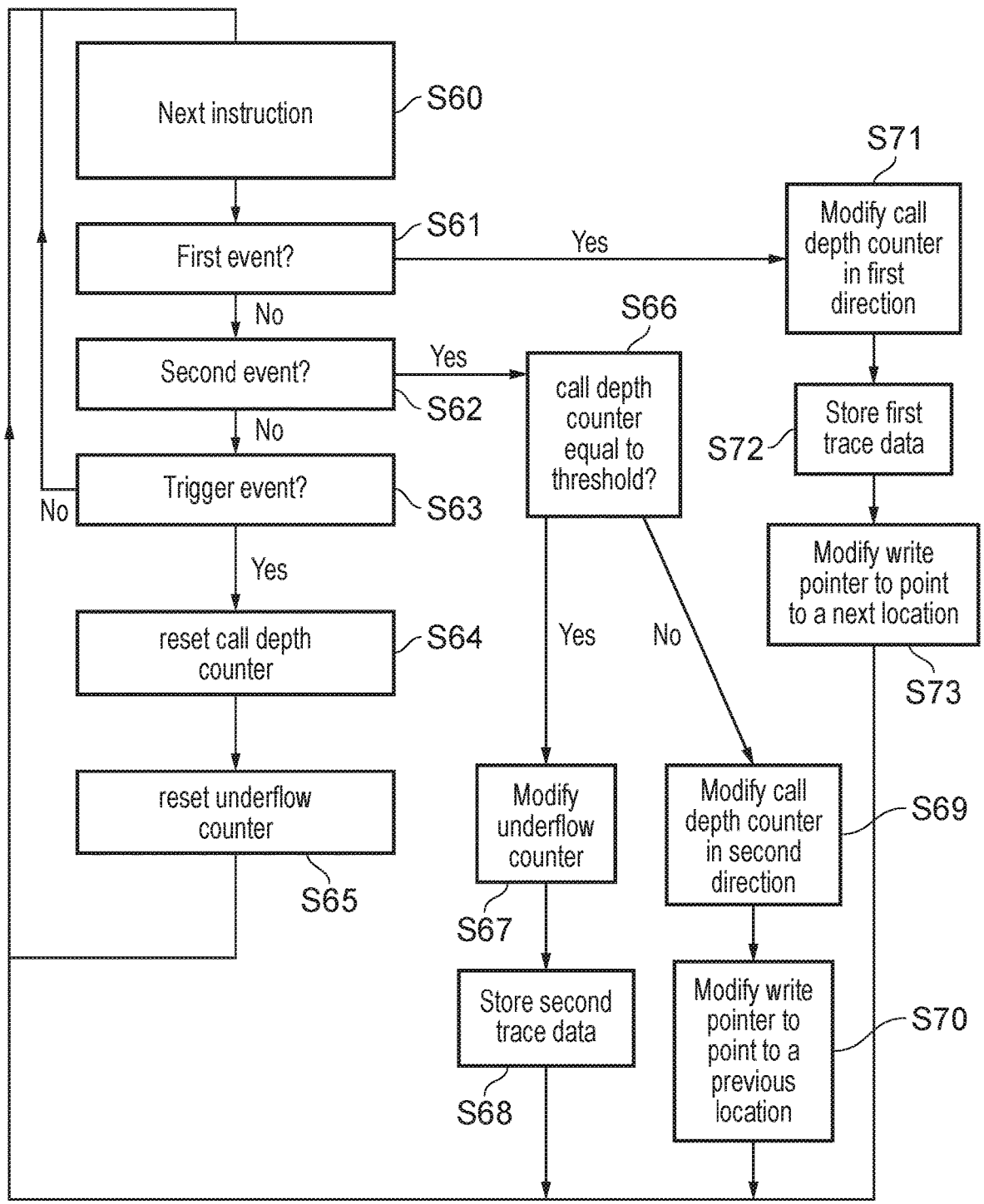
Figure 8:
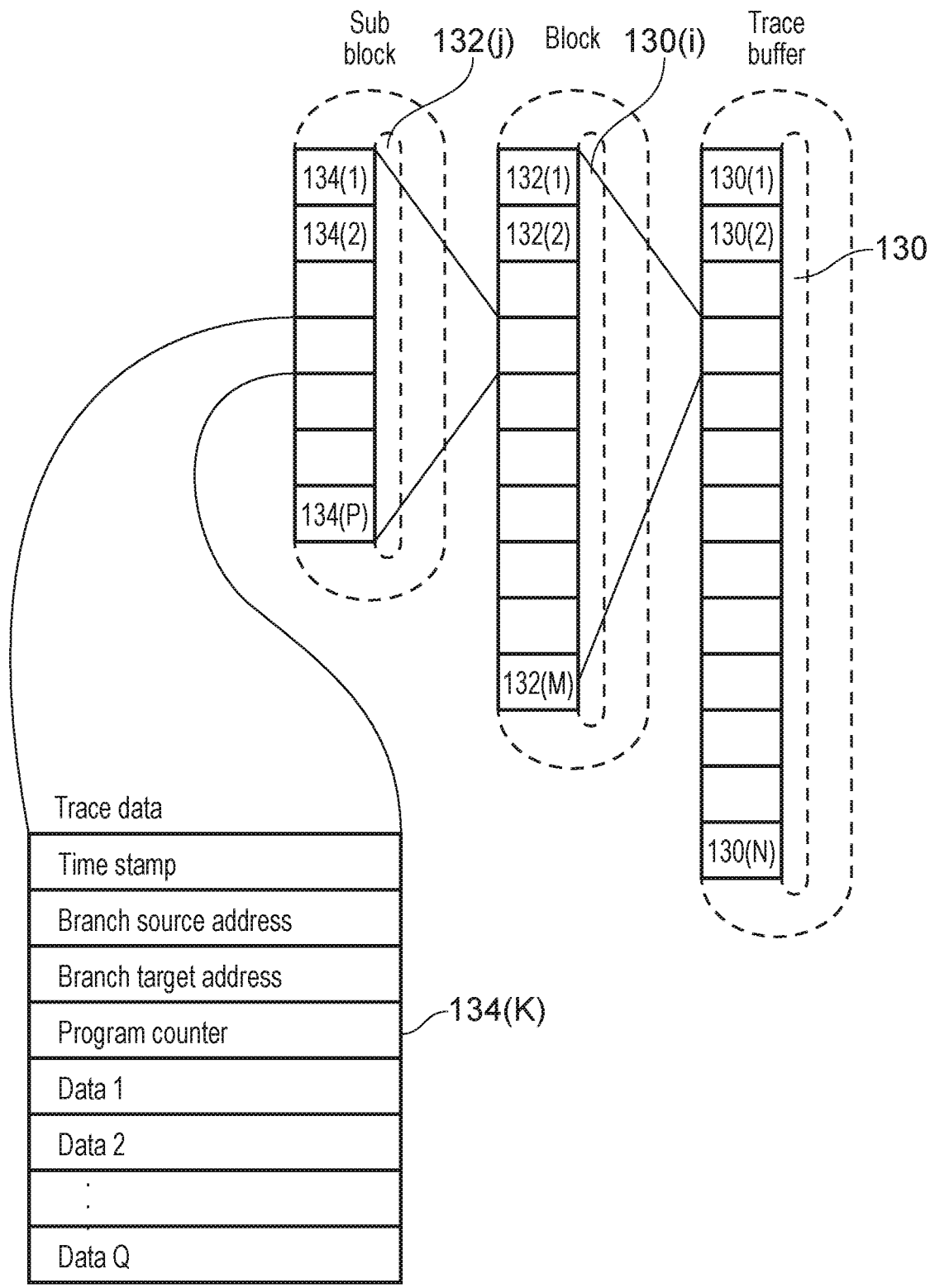
Figure 9:
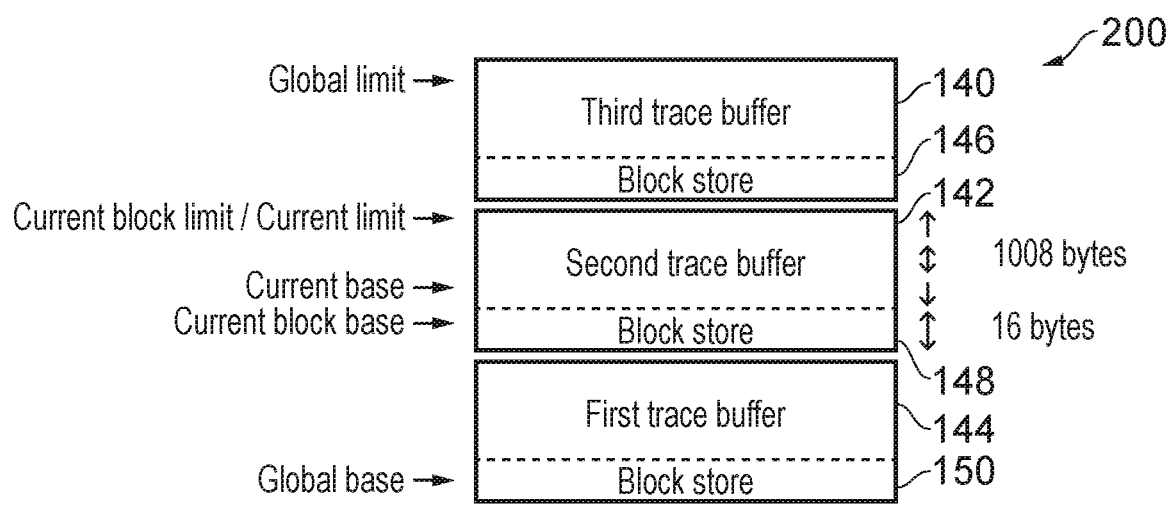

The present techniques will be described further, by way of example only, with reference to embodiments thereof as illustrated in the accompanying drawings, in which:

FIG. 1 schematically illustrates a data processing apparatus which may embody various examples of the present techniques;

FIG. 2 schematically illustrates details of the operation of trace circuitry which may embody various examples of the present techniques;

FIG. 3 shows a sequence of steps that are carried out by some examples of the present techniques;

FIG. 4 schematically illustrates a data processing apparatus which may embody various examples of the present techniques;

FIG. 5 schematically illustrates a data processing apparatus which may embody various examples of the present techniques;

FIG. 6 shows a sequence of steps that are carried out by some examples of the present techniques;

FIG. 7 schematically illustrates trace data which may be stored in various example examples of the present techniques;

FIG. 8 schematically illustrates a trace buffer which may embody various examples of the present techniques; and FIG. 9 schematically illustrates the layout of a trace buffer which may embody various examples of the present techniques.

At least some embodiments provide a data processing apparatus comprising: processing circuitry to process instructions; and trace circuitry comprising: a trace buffer; write pointer storage to store a write pointer to indicate a current location in the trace buffer; and a call depth counter to indicate a number of events, wherein the trace circuitry is configured to generate trace data indicative of processing activities of the processing circuitry, and in response to a first event to: modify the call depth counter in a first direction, store first trace data indicative of the first event in the trace buffer at the current location, and modify the write pointer to point to a next location in the trace buffer; and in response to a second event, when the call depth counter is not equal to a threshold call depth, to: modify the call depth counter in a second direction and modify the write pointer to point to a previous location in the trace buffer, and wherein the trace circuitry is responsive to a trigger event to reset a difference between the call depth counter and the threshold call depth.

The trace circuitry is configured to generate and store trace data at a current location. The trace data is indicative of a number of different events and is based on a number of different conditions. The trace circuitry comprises write pointer storage to store a write pointer that indicates the current location in the write buffer at which the data indicative of the processing activities should be written. In response to a first event the trace circuitry is configured to generate first trace data indicative of the first event and to store the first trace data in the trace buffer at a current location defined by the write pointer. The trace circuitry is further configured to modify the write pointer to point to a next location in the trace buffer. In this way repeated occurrence of the first event would cause a sequence of first trace data items to be generated and stored at a sequence of locations in the trace buffer. In addition, the trace circuitry is responsive to a second event to modify the write pointer to point to a previous location in the trace buffer. In this way the occurrence of a second event serves to rewind the trace buffer such that a subsequent occurrence of a first event could overwrite a previous occurrence of the first event.

The trace circuitry further comprises a call depth counter which is used to indicate a relative number of occurrences of the first event and the second event. In response to the first event, the trace circuitry is configured to modify the call depth counter in a first direction; and, in response to the second event, the trace circuitry is configured to modify the call depth counter in a second direction. In some embodiments, when the call depth counter is equal to a threshold call depth, the trace circuitry is configured to maintain a current value of the write pointer. In this way, the total amount by which the trace buffer can be rewound is limited by the threshold call depth which can be used to effectively fix trace items in the trace buffer that are retained regardless of the number of second events that occur. This mechanism provides a means of counting how many more times the first event has occurred than the second event. As an example, the trace circuitry may be configured to increment the call depth counter in response to the first event and to decrement the call depth counter in response to the second event, whilst in addition, the threshold call depth may be set to zero. In this way the call depth counter provides an indication of how many times the first event has occurred without a corresponding second event.

The apparatus is also responsive to the trigger event to reset a difference between the call depth counter and the threshold call depth. This mechanism means that, after a trigger event, the difference between the call depth counter and the threshold call depth can be used to determine the number of first events for which there has not been a corresponding second event since the last trigger event. As an example sequence of events we consider a trigger event followed by a sequence of first events followed by a subsequent sequence of second events. When the trigger event occurs the difference between the call depth counter and the threshold call depth is reset. The sequence of first events are then stored in the trace buffer with the write pointer being modified at each first event to point to a next location, and the call depth counter being modified in a first direction in response to each of the first events. The subsequent sequence of second events causes the write pointer to rewind through the trace buffer and causes the call depth counter to be modified in a second direction where, in some embodiments, the second direction is the opposite direction to the first direction. If there are more first events in the sequence of first events than there are second events in the subsequent sequence of second events then the call depth counter remains different to the threshold call depth and a number of first events remain in the trace buffer. If, on the other hand, the number of second events in the subsequent sequence of second events is greater than the number of first events in the sequence of first events then all of the first events are removed from the trace buffer. However, at the point when the number of first events stored in the trace buffer reaches zero, the call depth counter also reaches the threshold call depth. As a result, no further rewinding of the call depth counter takes place and any previously stored events in the trace buffer remain in the trace buffer. If, after the sequence of first events and the subsequent sequence of second events, there is a second trigger event then the difference between the threshold call depth and the call depth counter will be reset and any remaining first events that are stored in the trace buffer when the reset occurs will be maintained in the trace buffer.

The resetting of the call depth counter to the threshold call depth can take a number of different forms. In at least some embodiments the trace circuitry adapted to, when resetting the difference between the call depth counter and the threshold call depth, one of: reset the call depth counter to the threshold call depth; and set the threshold call depth to the call depth counter. By resetting the call depth counter to the threshold call depth, the threshold call depth can be implemented as a fixed value and the call depth counter maintains a value of the current number of first events that have not had a corresponding second event and that have occurred since the last trigger event. Alternatively, by setting the threshold call depth to the call depth counter two values are required to be stored, one for the threshold call depth and a second for the call depth counter. Using this mechanism the call depth counter provides a value of the total number of entries in the trace buffer. The difference between the call depth counter and the threshold call depth can be used to determine a value of the current number of first events that have not had a corresponding second event and that have occurred since the last trigger event. It will be apparent to the skilled person that resetting the call depth counter to the threshold call depth can, in some embodiments, be implemented by resetting either the call depth counter or the threshold call depth such that there is a known offset between the call depth counter and the threshold call depth. In such embodiments, the corresponding steps of determining whether the call depth counter and the threshold call depth are equal or not would correspond to determining whether a difference between the call depth counter and the threshold call depth is equal to the known offset.

In at least some embodiments the trace circuitry is responsive to the trigger event to store third trace data indicative of the trigger event in the trace buffer, and to modify the write pointer to point to a next location in the trace buffer. The third trace data stored in the trace buffer may allow the sequence of first events and second events to be reconstructed at a subsequent point. The third trace data could include data relating to the state of the call depth counter, or detailed information relating to the execution context of the processing circuitry at the point at which the trigger event occurs. In addition, the third trace data may include a timestamp, and/or data relating to a current state of the processing apparatus. In addition to writing the trace data the write pointer is advanced to a next location. It is noted that the advancing of the write pointer in response to the trigger event does not include incrementing the call depth counter. In this way the third trace data will be maintained in the buffer when the trigger event is followed by a subsequent sequence of second events, which would otherwise serve to rewind the trace buffer by sequentially modifying the write pointer to a previous value.

In at least some embodiments the trace circuitry is responsive to the trigger event to generate and store additional information indicative of the processing activities of the processing circuitry. In this way further information relating to events surrounding the trigger event can be stored. Such events are not limited and may correspond to any data relating to activities of the processing apparatus in general and may relate to the processing circuitry, the trace circuitry or any other components of the processing apparatus.

In at least some embodiments the data processing apparatus further comprises statistical profiling circuitry to sample processing information relating to a current instruction, wherein the additional information indicative of the processing activities of the processing circuitry is generated based on the processing information sampled by the statistical profiling circuitry. Statistical profiling is a technique for code profiling. When using statistical profiling the statistical profiling circuitry samples instructions and records the operation of the instruction and then writes this record to a buffer in memory. The buffer that is used to record the statistical profiling data is not necessarily the same buffer as the trace buffer, but could for example record time stamps to allow the statistical profiling record to be correlated with the trace buffer at a later stage. However, in some embodiments, the statistical profiling data is interleaved with the trace data. In particular, the statistical profiling record might be written between buffers, or incorporated into the trace as a separate item of trace data.

In at least some embodiments the trace circuitry is responsive to the second event, when the call depth counter is equal to the threshold call depth, to modify the write pointer to point to the next location in the trace buffer. In this way the trace buffer contains information that determines, after a trigger event, a record of first events that have occurred that, prior to another trigger event, are not followed by a subsequent second event; and the trace buffer keeps a record of second events that are not preceded by a corresponding first event. As an example, consider the following sequence of events:

- A trigger event—this acts to reset the difference between the call depth counter and the threshold call depth. It will be understood that this may be achieved by either the call depth counter or the threshold call depth being modified in dependence on the other. In some embodiments third trace data may also be written to the trace buffer that is indicative of the trigger event and may indicate a current value of the call depth counter and/or information relating to a number of second events that do not have a corresponding first event.
- A second event—as the call depth counter is equal to the threshold call depth there is no rewinding of the trace buffer. Instead, the write pointer is modified to point to a next location in the trace buffer.
- A second event—as the call depth counter is still equal to the threshold call depth there is no rewinding of the trace buffer. As in the case of the previous second event, the write pointer is modified to point to a next location in the trace buffer. As a result the trace buffer contains an indication that two second events have occurred since the trigger event.
- A first event—the trace circuitry is configured, in response to the first event, to generate first trace data indicative of the first event and to store the first trace data to the trace buffer. The call depth counter is modified in a first direction and the write pointer is modified to point to a next location in the trace buffer. At this point the trace buffer contains: optional third data indicative of the trigger event; an indication that two second events have occurred since the trigger event; and first trace data indicative of the first event.
- A further sequence of first events followed by a same number of second events—this sequence causes first trace data to be written, the write pointer to be modified to point to a next location and the call depth counter to be modified in a first direction at each occurrence of the first trace data. As each second event occurs the write pointer is rewound to point to a previous location, and the call depth counter is modified in a second direction. As there are a same number of first and second events, and the second events follow the first events, the net result is that the write pointer has been rewound to point to the position prior to the further sequence of first events and the same number of second events. The items of first trace data that have been written remain in the trace buffer but will potentially be overwritten in response to further first events.
- A further trigger event—this causes the difference between the call depth counter and the threshold call depth is reset. This action causes the first trace data indicative of the first events and the indication that two second events have occurred since the first trigger to be maintained in the trace buffer regardless of a number of second events that occur subsequently. In some embodiments third trace data may also be written to the trace buffer that is indicative of the trigger event and may indicate a current value of the call depth counter and/or information relating to a number of second events that do not have a corresponding first event In this way a sequence of first and second events can be determined from the trace buffer. As an example, if the first event is a subroutine call and the second event is a subroutine return, then it is possible to establish a subroutine call stack at an instance between a first trigger event and a second trigger event. In addition, by reconstructing the subroutine call/return stack between all trigger events it is possible to establish the full function call return stack at the point of any trigger event. It is noted that the second events (in this example subroutine returns) cause the write pointer to rewind and effectively allow the overwriting of the first events (in this example subroutine calls). Hence, any sequence of subroutine calls that have ended (due to the occurrence of a corresponding sequence of subroutine returns) at the point of the second trigger event are effectively not stored in the trace buffer (as they can potentially be overwritten by subsequent events). However, if the trigger event had occurred during the sequence of subroutine calls before the corresponding subroutine returns had occurred then the trace buffer would contain trace data indicative of the subroutine call stack at the point of the trigger event and would therefore capture this sequence of subroutine calls.

In at least some embodiments, in response to the second event, when the call depth counter is equal to the threshold call depth, to store second trace data indicative of the second event in the trace buffer at the current location. The second trace data can comprise a number of different items of data. For example, any data items indicative of the second event could be incorporated into the second trace data. In addition, in some embodiments the second trace data can include information indicative that the call depth counter is equal to the threshold call depth. In other embodiments the second trace data may be written to overwrite existing first trace data that may, as a result of the mechanisms described above, be already present at the location indicated by the write pointer. This provides a method by which it is possible to count how many more times the first event has occurred than the second event or, alternatively, how many more times the second event has occurred than the first event.

In at least some embodiments, the trace buffer further comprises an underflow counter, and the trace circuitry is responsive to the second event, when the call depth counter is equal to the threshold call depth, to modify the underflow counter. This provides an alternative way of capturing a number of times the second event has occurred where the second event does not follow a previous first event. In particular, when the underflow counter is equal to the threshold underflow and the call depth counter is equal to the threshold call depth, the trace circuitry is configured to modify the underflow counter as a means of tracking, since the last event at which the call depth counter was reset, how many second events have occurred that have not been preceded by a corresponding first event.

In at least some embodiments the trace circuitry is responsive to the second event, when the call depth counter is equal to the threshold call depth and the underflow counter is equal to a threshold underflow, to: store second trace data indicative of a current value of the underflow counter; and modify the write pointer to point to the next location in the trace buffer, and wherein the trace circuitry is responsive to the second event, when the call depth counter is equal to the threshold call depth and the underflow counter is not equal to the threshold underflow, to: modify the write pointer to point to the previous location in the trace buffer; store second trace data indicative of a current value of the underflow counter; and modify the write pointer to point to the next location in the trace buffer.

This provides an alternative way of capturing a number of times that the second event has occurred. In particular, when the underflow counter is equal to the threshold underflow and the call depth counter is equal to the threshold call depth, the trace circuitry is configured to store second trace data indicative of the second event, and to indicate a value of the underflow counter in the second trace data. The trace circuitry is further configured to modify the write pointer to point to a next location in the trace buffer. As a result, a subsequent first event will not cause the second trace data indicative of the second event to be overwritten and a record of the underflow, i.e., of the number of times a second event has occurred without a preceding first event, is maintained in the trace buffer. In order to prevent a separate set of second trace data indicative of the second event from being written at each occurrence of a second event that is not preceded by a first event, the trace circuitry is configured to, when the call depth counter is equal to the call depth and the underflow counter is not equal to the threshold underflow (i.e., there is already second trace data indicative of the second event that contains an indication of an underflow written to the trace buffer): modify the underflow counter; modify the write pointer to point to the previous location (which is the location of the previously written second trace data indicative of the second event that contains the indication of an underflow); then to write second trace data indicative of the second event that contains an indication of the modified underflow; and then to modify the write pointer to point to the next location. In this way, a record of the underflow is maintained. The following table illustrates an example sequence of events and the corresponding data that is stored in the trace buffer. In this example it is assumed that the call depth counter and the underflow counter are initialised to zero and that modifying the call depth counter in the first and second directions correspond to incrementing and decrementing the call depth counter respectively. In addition, in this example, it is assumed that modifying the underflow counter corresponds to incrementing the underflow counter.

TABLE 1

| Sequence number | Event | Call depth counter | Underflow counter | Trace buffer |
|---|---|---|---|---|
| 0 | Initial state | 0 | 0 | |
| 1 | $2^{nd}$ event | 0 | 1 | UC = 1 \| |
| 2 | $2^{nd}$ event | 0 | 2 | UC = 2 \| |
| 3 | $1^{st}$ event | 1 | 2 | UC = 2 \| $1^{st}$ trace data \| |
| 4 | $1^{st}$ event | 2 | 2 | UC = 2 \| $1^{st}$ trace data \| $1^{st}$ trace data \| |
| 5 | $2^{nd}$ event | 1 | 2 | UC = 2 \| $1^{st}$ trace data \| |
| 6 | $2^{nd}$ event | 0 | 2 | UC = 2 \| $1^{st}$ trace data |
| 7 | $2^{nd}$ event | 0 | 3 | UC = 3 \| |

In Table 1 the call depth counter and the underflow counter values are indicative of the value of the call depth counter and the underflow counter after the trace circuitry has finished performing the sequence of modifications described above. Table 1 illustrates how the trace circuitry responds to a sequence of events. Initially (sequence number 0) the call depth counter and the underflow counter are set to zero. This could, for example, be as a result of a preceding trigger event or as a result of the system being initialised. The skilled person would recognise that this is purely by way of example and that the mechanisms described in these embodiments would be applicable to any initial values of the call depth counter, the underflow counter and the trace buffer.

At sequence number 1 a second event occurs. The trace circuitry is responsive to the second event to generate second trace data indicative of the second event. In addition, the trace circuitry is configured to, in response to the call depth counter being equal to the threshold call depth and the underflow counter being equal to the threshold underflow, indicate in the second trace data a value of the underflow (UC=1) and to modify the write pointer to point to a next location in the trace buffer. At sequence number 2 another second event occurs. The trace circuitry is responsive to the call depth counter being equal to zero and the underflow counter being not equal to zero (i.e. equal to 1 in this example) to first modify the write pointer to point to the previous location, then to write second trace data indicative of the second event where the second trace data includes a value of the underflow (UC=2), then finally to modify the write pointer to point to the next location.

At sequence numbers 3 and 4 a first event occurs. As a result the trace circuitry generates trace data indicative of the first event and stores the trace data in the trace buffer in addition to modifying the call depth counter in the first direction and modifying the write pointer to point to the next location. At sequence numbers 5 and 6 a second event occurs. The trace circuitry, responsive to the call depth counter being not equal to the threshold call depth modifies the call depth counter in the second direction. At this point the call depth counter has been modified in the second direction a same number of times that it has been modified in the first direction. As a result, once the trace circuitry has completed storing data and modifying counters as a result of sequence number 6, the call depth counter is equal to the threshold call depth again.

At sequence number 7 a second event occurs. As a result the trace circuitry generates trace data indicative of the second event and, responsive to the call depth counter being equal to the threshold call depth and the underflow counter being not equal to the threshold underflow, the trace circuitry first modifies the write pointer to point to the previous location, then modifies the underflow counter, then writes to the trace buffer the second trace data indicative of the second event that also contains an indication of the underflow (UC=3), then the trace circuitry modifies the write pointer to point to the next location. In this way the trace circuitry is able to maintain a record of a number of second events that have occurred without a preceding first event.

In at least some embodiments the trace circuitry is responsive to the trigger event to indicate, in the third trace data, a current value of the underflow counter. The current underflow counter might be kept in a register, and when a trigger event occurs the underflow counter may be written out as part of the third trace data. In this way, the current underflow counter is stored in a register and past underflow counters are stored to the trace buffer as part of the third trace data.

In at least some embodiments the trace circuitry is responsive to the trigger event to reset the underflow counter to the threshold underflow. Combined with the mechanism set out above, the trace circuitry is able maintain trace data indicative of a stack of first events that have occurred since a previous trigger event and to keep an indication of second events that have occurred since a previous trigger event for which a corresponding first event did no occur since the trigger event. By way of example, the first event may be a subroutine call and the second event may be a subroutine return. If a first trigger event occurs after a number of subroutine calls, such that the current subroutine call return stack is quite large, there may be a subsequent number of subroutine returns corresponding to subroutine calls that occurred before the trigger event. By combining the stored value of the underflow counter with the trace data stored prior to the first trigger event a state of the subroutine call return stack at a subsequent trigger event can be reconstructed without the need for the stored trace data to contain a complete listing of every subroutine call and every subroutine return. In this way a compact set of trace data can be stored that is indicative of a state of the subroutine call return stack at a number of trigger events.

In at least some embodiments the threshold underflow is zero. In this way a binary counter can be used to indicate a current value of the underflow. This counter could be implemented, for example, using a 4 bit binary counter, an 8 bit binary counter or, a 16 bit binary counter, although it would be readily apparent to the skilled person that a counter of any size could be used.

In at least some embodiments the underflow counter is initialised to the threshold underflow. As a result trace data collected between the initialisation and the first trigger event will be indicative of any underflow that occurs subsequent to the initialisation, but before the first trigger event.

In at least some embodiments the trace data is stored as a packet of trace data of a predetermined size. As a result the modification of the write pointer to point to the previous location or the next location can be implemented by adding a value to, or subtracting a value from, the write pointer that corresponds to the predetermined size. However, it would be readily apparent to the skilled person that any method for modifying the write pointer to point to the previous or the next location could be used. For example if the predetermined size was N bytes of data then the modification to point to the next location could comprise one of adding a value of N bytes to the write pointer or subtracting N bytes from the write pointer. In addition, for example, the modification to point to the previous location could comprise the other of adding a value of N bytes to the write pointer or subtracting N bytes from the write pointer. This mechanism means that no additional data is required to be stored with the trace data to indicate a location of the next location and the previous location.

In at least some alternative embodiment the trace data is stored as a packet of trace data and a size of the packet of trace data is indicated in the trace data. The size of the packet of trace data may be indicated in a number of ways. For example the trace data may comprise a base pointer and a limit pointer to determine an address of the start of the trace data and an address of the end of the trace data. Alternatively the trace data may specify data indicative of the size of the packet of trace data. It would be readily apparent to the skilled person that any method of storing data that is indicative of where the trace data is stored in the trace buffer can be used to determine the size of the trace data. In addition the trace data may comprise data indicative of the previous location and the next location. The next location may correspond to an address adjacent to the current location. Alternatively the next location may be stored at an address that is not adjacent to the current location. In this way the trace buffer can be distributed across system memory rather than being stored in a dedicated trace buffer.

In at least some embodiments the trace buffer is divided into a plurality of blocks and each block of the plurality of blocks has a block size defined by a block base and a block limit, and wherein the block size is an integer multiple of the predetermined size. In this way the trace buffer can be split into a plurality of regions corresponding to each of the plurality of blocks in order to generate trace data that is structured based on the sequence of first events and second events. For example trace data indicative of processor activities occurring at a same level in a first event/second event stack can be maintained in an individual block of the plurality of blocks. In this way further historical detail relating to the processing activities of the processing circuitry can be maintained.

In at least some embodiments the current location is a location in a current block of the plurality of blocks, and wherein the trace circuitry is responsive to trace data being stored to the current block to increment the location in the current block by the predetermined size. In this way a subsequent item of trace data stored in a block of the plurality of blocks can be stored in addition to the previous item of trace data stored in the block of the plurality of blocks rather than overwriting this data.

In at least some embodiments the data processing apparatus is responsive to the location in the current block being greater than or equal to the block limit to reset the location in the current block to a current block base. Each block of the plurality of blocks acts as an individual circular buffer. When a block is full such that the next location would point to a location that is not contained within the limits defined by the block base and the block limit the current location is reset to point to the current block base. In this way each block maintains a number of items of trace data relating to the first event and the second event. This provides further historical information of the first event and the second event that can be reconstructed subsequent to the collection of the trace data. In at least some alternative embodiments the data processing apparatus is responsive to the location in the current block being greater than the block limit to reset the location in the current block to a current block base. In this way both inclusive limits, where the limit is the last location inside the current block, and exclusive limits, where the limit is the first location outside the current block, can be defined. It would be readily apparent to the skilled person that the trace data can be stored in the opposite direction by decrementing the location and that any test which determines whether a location is contained in a current block or whether the location falls outside the current block could be used.

In some embodiments the next location is a location in a next block of the plurality of blocks, and the previous location is a location in a previous block of the plurality of blocks. In this way the trace circuitry is responsive to the first/second event to cause the write pointer to point to a location in the next/previous block. As the location in each block is incremented by the predetermined size this means that in response to a first event trace data will be written to a location in the current block. The location in the current block will be incremented by the predetermined size such that next time trace data is written to the current block it does not overwrite the trace data that has been most recently written to the current block. In addition, the write pointer is modified to point to a next location corresponding to a location in a next block of the plurality of blocks. When the sequence of first events and second events is such that the write pointer is (at a future point) modified to point back to the current block the next data to be written will not overwrite the data that has been written but will be written at the current location in the current block. In this way, each block of the plurality of blocks maintains a history of a most recent M sets of trace data written to that block, where M is the integer multiple of the predetermined size that defines the block size.

In at least some embodiments each of the blocks of the plurality of blocks is divided into a plurality of sub-blocks, and each of the sub-blocks has a sub-block size defined as an integer multiple of the predetermined size. In this way a deeper nesting of first trace data indicative of the first event and second trace data indicative of the second event is maintained in the trace buffer. In at least some embodiments the sub-block size is the predetermined size. In this way each sub-block of data comprises a single set of trace data corresponding to one of the first event, the second event, and the trigger event.

In at least some embodiments the trace data comprises a plurality of trace items sequentially written to a current sub-block of a current block, wherein the current location is defined based on a location of the current sub-block and a current sub-block offset, and wherein the trace circuitry is responsive to the current sub-block offset being greater than or equal to the sub-block size to reset the current sub-block offset to zero. In this way the sub-block behaves as a circular buffer for the trace data. When collecting trace data, the trace circuitry can constantly write the trace data to the current sub-block in the trace buffer. When the current sub-block is full the current sub-block offset is reset and the trace data wraps around. As a result, when the first/second event occurs the trace data indicative of the first/second event is already written to the trace buffer. The resulting trace buffer can therefore be set up as a buffer of circular buffers (the plurality of blocks) where each of the plurality of blocks comprises a further plurality of circular buffers (the plurality of sub-blocks). This allows the current first event/second event stack to be reconstructed after a plurality of trigger events and provides history of the occurrence of a number of first events and second events that are not essential to the generation of the first event/second event stack but that may also provide further information relating to the operation of the data processing circuitry.

In at least some embodiments the trace circuitry is responsive to the first event to perform one of: storage of the plurality of trace items in the current sub-block; storage of a number of further trace items to the current sub-block prior to modifying the write pointer, wherein the number of further trace items corresponds to a fraction of the predetermined size; and storage of the number of further trace items to the current sub-block prior to modifying the write pointer, wherein the number of further trace items corresponds to the predetermined size. These options correspond to storing trace data indicative of events that occurred before the first event, around the first event, and after the first event to be stored in the sub-block of the trace buffer respectively.

In at least some embodiments the trace circuitry is responsive to the second event, when the call depth counter is not equal to the threshold call depth, to perform one of: storage of the plurality of trace items in the current sub-block; storage of a number of further trace items to the current sub-block prior to modifying the write pointer, wherein the number of further trace items corresponds to a fraction of the predetermined size; and storage of the number of further trace items to the current sub-block prior to modifying the write pointer, wherein the number of further trace items corresponds to the predetermined size. These options correspond to storing trace data indicative of events that occurred before the second event, around the second event, and after the second event to be stored in the sub-block of the trace buffer respectively.

In at least some embodiments the trace buffer has a trace buffer size defined by a global base pointer and a global limit pointer, and wherein the trace circuitry is responsive to the current location defined by the write pointer falling outside the trace buffer to set the write pointer to the global base pointer. The trace buffer set up in this way behaves as a circular buffer. The result is that the trace buffer behaves as a circular buffer comprising a plurality of circular buffers (blocks) that comprise a plurality of circular buffers (sub-blocks). This allows a trace buffer of a more limited size to be provided that only stores data indicative of first events and second events that occur near the top of the stack, whilst allowing the trace buffer to maintain data indicative of a plurality of trigger events, to maintain historical occurrences of the first event and the second event within each of the blocks, and to store trace data indicative of events occurring before, around, or after the first event and the second event.

In some embodiments the first event is a subroutine call and the second event is a subroutine return. In this way the trace buffer comprises trace data that can be used to reconstruct the subroutine call return stack at a number of different trigger points without the need to store trace data indicative of every subroutine call and every subroutine return.

In some embodiments the first event is an exception event and the second event is an exception return event. In this way the trace buffer comprises trace data that can be used to reconstruct information relating to a sequence of exception events and exception return events without the need to store data indicative of every exception event and every exception return.

In some embodiments the first event is one of a plurality of first events comprising at least one of a subroutine call and an exception event, and wherein the second event is one of a plurality of second events comprising at least one of a subroutine return and an exception return event. In this way the trace circuitry is configured to generate trace data that is indicative of a number of different possible events. Different counters may be used to keep track of each type of event in the plurality of first events and the plurality of second events. For example, a first underflow counter may be used to track underflows corresponding to a first type of first event and a corresponding first type of second event. In addition, a second underflow counter may be used to track underflows corresponding to a second type of first event and a second type of second event. Similarly, a first call depth counter may be used to track the call depth associated with a first type of first event and a corresponding first type of second event. In addition a second call depth counter may be used to track the call depth associated with a second type of first event and a second type of second event. The plurality of first events and second events may comprise any events for which trace data can be generated and for which a stack may be maintained. In particular the trace circuitry could be responsive to both subroutine calls/returns and exception events/returns using this mechanism in addition to being responsive to a third type of first and second event. In this way first event/second event stacks can be generated for a plurality of different types of events.

In at least some embodiments the trace data is indicative of at least one of: a branch source address; a branch target address; a timestamp; and a current value of a program counter. By recording data indicative of a location in a program or a time at which the trace data is generated, the corresponding trace data can be correlated with additional profiling data, for example statistical profiling data, that may be stored in a separate buffer.

In at least some embodiments the threshold call depth is zero. In this way a binary counter can be used to indicate a current value of the call depth. This counter could be implemented, for example, using a 4 bit binary counter, an 8 bit binary counter or, a 16 bit binary counter, although it would be readily apparent to the skilled person that a counter of any size could be used.

In at least some embodiments the call depth counter is initialised to the threshold call depth. As a result trace data collected between the initialisation and the first trigger event will be indicative of any underflow that occurs subsequent to the initialisation but before the first trigger event.

At least some embodiments provide a method of storing trace data in a trace buffer comprising: processing instructions; generating the trace data indicative of the processing; in response to a first event: modifying a call depth counter in a first direction; storing first trace data indicative of the first event in the trace buffer at a current location defined by a write pointer; and modifying the write pointer to point to a next location in the trace buffer; and in response to a second event and when the call depth counter is not equal to a threshold call depth: modifying the call depth counter in a second direction; and modifying the write pointer to point to a previous location in the trace buffer, and resetting, in response to a trigger event, a difference between the call depth counter and the threshold call depth.

At least some embodiments provide a data processing apparatus comprising: means for storing trace data; means for processing instructions; means for generating the trace data indicative of processing activities of the means for processing; means for, in response to a first event: modifying a call depth counter in a first direction; storing first trace data indicative of the first event in the means for storing trace data at a current location defined by a write pointer; and modifying the write pointer to point to a next location in the means for storing trace data; and means for, in response to a second event and when the call depth counter is not equal to a threshold call depth: modifying the call depth counter in a second direction; and modifying the write pointer to point to a previous location in the means for storing trace data, and means for resetting, in response to a trigger event, a difference between the call depth counter and the threshold call depth.

At least some embodiments provide a trace buffer configured to operate in a mode of operation in which the total trace buffer is split into multiple blocks, which are used in turn. On occurrence of a trigger event, the trace buffer saves the state of the current block, and moves on to a new one. Each block acts as an independent circular buffer. In some embodiments the trace buffer can be defined by a global base and a global limit pointer which, in some embodiments may be programmed by software, and define the absolute start and end of the total trace buffer. For an embedded trace buffer or a trace buffer mapped into a system memory the global base and the global limit pointer might be implied rather than programmed. In addition, a block size is defined. The block size is smaller than the total trace buffer, and in some embodiments is much smaller. In some embodiments the block size is a power-of-two for simpler implementation. In some embodiments the block size is programmable. However, in other embodiments the block size is fixed.

In some embodiments a current block base defines a current block within the total trace buffer. The current block limit is the current block base plus the block size. In some embodiments, the current block base is a multiple of the block size. This allows the current block base and limit to be derived from a current value of the write pointer. In some embodiments the current base and the current limit pointer are used to define a current trace buffer that is a portion of the total trace buffer. The current base is a known offset above the current block base, and the current limit is a known offset below the current block limit. In some embodiments these offsets are fixed by the implementation, and are used to create a small current block store. In other embodiments these limits may be programmable. In some example embodiments, the current base might be the current block base+16 bytes, and the current limit might be the current block limit. This gives a 16 byte region at the start of the block which is defined as a current block store.

In some embodiments the current block base is initially set to the global base. Between trigger events, the trace buffer operates to store trace data before, around, or after a trigger event, where the trace is collected to the current trace buffer. In other words, the current trace buffer operates as a circular buffer. On a trigger event, a trigger counter operates to count a number of trigger events. In some embodiments, the trace buffer might write a timestamp to a known offset within the current block store. However, when the trigger counter reaches a threshold, instead of flushing the trace buffer or stopping collection of trace, the trace buffer flushes the trace buffer and writes the final trace write pointer value to a known offset within the current block store. In addition the trace buffer sets the new current block base to the current block limit. This has the effect of setting the new current block limit. If the new current block limit lies above the global limit, then the trace buffer is configured to stop collecting trace data.

In some embodiments when software comes to decode the trace the pointers stored in the block store can be used to locate the ends of the circular buffers for each block. Using timestamps in the trace, or from the block store, the trace blocks can be correlated with other traces. For example, the trace from statistical profiling circuitry.

In some embodiments the trace buffer is configured to set the new current block base to the global base in the event of the final buffer being filled, thus giving a circular buffer of circular buffers. In some embodiments the trace buffer is configured to move to a randomly chosen next current block. Thus the global buffer ends up filled with a random selection of traces, with older traces being less likely to be retained. In some embodiments the statistical profiling record might be written between buffers, or in the block store, or incorporated into the trace (as a separate trace ID). In some embodiments this scheme can be implemented recursively, with a series of triggers causing the trace buffer to advance by different amounts, blocks within blocks, etc.

In some embodiments the buffer split into multiple blocks can be extended to provide an enhanced stack history trace. In some embodiments the trace circuitry and trace buffer operate as normal. On a function call, the trace circuitry generates a trigger event that behaves as described above. This causes the trace buffer to advance to a new current trace buffer above the current trace buffer. On a function return, the trace macrocell generates a reverse trigger event which behaves as described above, except that the trace buffer reverses backwards, such that the new trace buffer is now the trace buffer below the current trace buffer. In addition, the trace buffer reads the write pointer from the data store and resumes storing trace from where it left off. In some embodiments a counter mechanism or the global base pointer may be used to prevent underflow of the buffer. This has the effect of generating a sequence of trace buffers, each containing trace of a single function on the call stack.

Some particular embodiments are now described with reference to the figures.

FIG. 1 schematically illustrates a data processing apparatus 10 which may embody various examples of the present techniques. The data processing apparatus 10 comprises processing circuitry 12 to process instructions and trace circuitry 14. The trace circuitry 14 comprises a trace buffer 16 to store trace data indicative of processing activities of the processing circuitry 12 and a write pointer 18 to point to a current location in the trace buffer 16. The trace circuitry 14 further comprises a call depth counter 20 to indicate a number of events and a threshold call depth 22. The trace circuitry 14 is responsive to a first event to generate first trace data indicative of the first event, to store the first trace data in the trace buffer 16 at a current location pointed to by the write pointer 18, to modify the call depth counter 20 in a first direction, and to modify the write pointer 18 to point to a next location in the trace buffer 16. The trace circuitry 14 is also responsive to a second event, when the call depth counter 20 is not equal to the threshold call depth 22, to modify the call depth counter 20 in a second direction and to modify the write pointer 18 to point to a previous location in the trace buffer 16. The trace circuitry 14 is also responsive to a second event, when the call depth counter 20 is equal to the threshold call depth 22, to optionally generate second trace data indicative of the second event and to store the second trace data in the trace buffer 16 at the current location indicated by the write pointer 18. In response to the second event, when the call depth counter 20 is equal to the threshold call depth 22, the write pointer is maintained to point at the current location and is not modified to point to the next location or to point to the previous location. Further details of the trace circuitry 14 and the trace buffer 16 will be set out below.

FIG. 2 schematically illustrates details of trace circuitry which may embody various examples of the present techniques. FIG. 2 illustrates processing activities 24 comprising a sequence of activities A-J for which trace data is to be generated. The trace data is stored in a circular buffer 30 which forms part of the trace buffer and may be defined in a number of ways. For example, the circular buffer could be defined by any two of: a base pointer, a limit pointer, and a circular buffer size. In addition, a current location in the circular buffer is defined by a current location pointer 28. As the processing circuitry 12 carries out processing activities 24 the trace circuitry 14 generates trace data items a-j corresponding to the sequence of activities A-J. As the trace data items are written to the circular buffer 30 the current location pointer 28 is advanced through the circular buffer and, when the buffer is full, indicated by the current location pointer 28 pointing to a location that falls outside of the circular buffer, the current location pointer 28 wraps around to point to a first location to be written to within the circular buffer 30. It is noted that in various embodiments the current location pointer 28 may correspond to the write pointer 18. The trace circuitry 14 is responsive to a number of events to cause the current trace data in the circular buffer 30 to be stored to the trace buffer 26. These events may correspond to the first event, the second event or the trigger event. The storage of the circular buffer 30 to the trace buffer 26 may require the physical movement of data or, alternatively, the circular buffer 30 may comprise part of the trace buffer 26 and the storage of data to the trace buffer may comprise advancing the current location pointer 28 to correspond to a different portion of the trace buffer 26.

The response to the trigger can be configured in various ways. In some embodiments the trace circuitry 14 may stop writing to the circular buffer 30 when the trigger occurs, such that the trace data stored in the circular buffer 30 corresponds to trace data that corresponds to processing activities prior to the trigger. In other alternative embodiments the trace circuitry may stop writing to the circular buffer 30 once the current location pointer 28 has looped around to the location at which the trigger was received. In this way the circular buffer 30 stores data that corresponds to processing activities that occurred after the trigger. In other alternative embodiments the trace circuitry 14 may be configured to stop writing to the circular buffer 30 at some point in between the two previous examples such that a number of additional trace data items are stored to the circular buffer 30 yet the circular buffer 30 still contains trace data indicative of processing activities prior to the trigger event. In these embodiments the circular buffer 30 contains trace data that is indicative of trace events that occur around the trigger.

FIG. 3 shows a sequence of steps that are carried out by some embodiments of the present techniques. The steps carried out in FIG. 3 correspond to steps carried out by the data processing apparatus 10. The flow can be considered to start at step S31, where the processing circuitry 12 receives a next instruction in a sequence of instructions. At step S32 the trace circuitry 14 determines whether the instruction corresponds to a first event or not. If yes, the flow proceeds to step S38 where the trace circuitry 14 modifies the call depth counter 20 in a first direction before proceeding to step S39. At step S39 the trace circuitry 14 generates first trace data indicative of the first event and stores the first trace data in the trace buffer 16 at a current location indicated by the write pointer 16 before proceeding to step S40. At step S40 the trace circuitry 14 modifies the write pointer 18 to point to a next location in the trace buffer 16 before the flow proceeds back to step S31. Returning to step S32, if it is determined that the instruction does not correspond to a first event then flow proceeds to step S33. At step S33 the trace circuitry 14 determines whether the instruction corresponds to a second event. If no, then the flow returns to step S31. On the other hand, if the trace circuitry 14 determines that the instruction corresponds to the second event, then flow proceeds to step S34. At step 34 it is determined whether the call depth counter 20 is equal to the threshold call depth 22. If yes, then flow proceeds to step S35 where the trace circuitry 14 optionally generates second trace data indicative of the second event and stores the second trace data in the trace buffer 16 before the flow returns to step S31. In some embodiments, at step S35 the trace circuitry maintains a current value of the write pointer (the write pointer is not modified to point to the next location or the previous location, but instead continues to point to the current location). If however, at step S34 it is determined that the call depth counter 20 is not equal to the threshold call depth 22 then flow proceeds to step S36. At step S36 the call depth counter 20 is modified in a second direction before flow proceeds to step S37 where the write pointer is modified to point to a previous location. Finally, flow proceeds from step S37 to step S31 in preparation for the next instruction.

FIG. 4 schematically illustrates a data processing apparatus which may embody various examples of the present techniques. The data processing apparatus 40 comprises processing circuitry 42 for processing instructions, trace circuitry 44 to generate trace data indicative of processing activities of the processing circuitry, and statistical profiling circuitry 54 for generating additional information indicative of the processing activities of the processing circuitry based on statistical profiling techniques. The trace circuitry 44 comprises a trace buffer 46 for storing trace data generated by the trace circuitry and the additional information indicative of the processing activities based on statistical profiling techniques generated by the statistical profiling circuitry 54. The trace circuitry 44 further comprises a write pointer 48 to point to a current location in the trace buffer 46, a call depth counter 50 for indicating a number of events and a threshold call depth 52. In response to a trigger event the statistical profiling circuitry 54 is configured to generate the additional data indicative of the processing activities of the processing circuitry 42 and to pass the additional data to the trace circuitry 44. The trace circuitry 44 is configured to store the additional data generated by the statistical profiling circuitry 54 in the trace buffer 46 such that the trace data generated by the trace circuitry 44 is interleaved with the additional data generated by the statistical profiling circuitry 54. In this way a detailed view of the state of the processing circuitry 42 can be obtained based on a detailed snapshot of the processing circuitry generated by the statistical profiling circuitry 54 over a short window of time and a less detailed view of the state of the processing circuitry 42 generated by the trace circuitry 44 over a much longer window of time.

FIG. 5 schematically illustrates a data processing apparatus which may embody various examples of the present techniques. The data processing apparatus 56 comprises processing circuitry 62 to perform processing activities and trace circuitry 64 to generate trace data indicative of the processing activities of the processing circuitry. The processing circuitry comprises a clock 82 to generate a timestamp indicative of a time at which an instruction is executed and a program counter 84 to indicate a location of an instruction in a stream of instructions. As discussed the processing circuitry 62 performs processing activities relating to a sequence of instructions 86. The sequence of instructions 86 may comprise instructions that do not trigger the trace circuitry 64 to generate trace data, and instructions that are also events that cause the trace circuitry 64 to generate trace data.

The trace circuitry 64 comprises a trace buffer 66 to store the trace data generate by the trace circuitry 64. Further details of the trace buffer 66 will be provided below. The trace circuitry 64 further comprises a global limit pointer 80 to determine a limiting address of the trace buffer and a global base pointer 78 to determine a first address of the trace buffer. It would be appreciated by the skilled person that this is just one way to define a trace buffer and that alternatives, for example, by defining any two of a global limit pointer 80, a global base pointer 78 and a buffer size are equivalent. The trace circuitry 64 further comprises a write pointer 68 to indicate a current location in the trace buffer 66 to which the trace data is to be written, a call depth counter 70 indicative of a number of events, a threshold call depth 72, an underflow counter 74 indicative of an underflow of a first event/second event stack and a threshold underflow 76.

The trace circuitry 64 may be responsive to any number of events including a first event and a second event. The first event and the second event may comprise a function call and a function return, a subroutine call and a subroutine return, an exception event and an exception return, or any other event for which it may be desirable to generate trace data. In response to the first event encountered by the processing circuitry 62 in the sequence of instructions 86, the trace circuitry 64 is configured to generate first trace data indicative of the first event of the processing circuitry 62. The trace circuitry 64 is further configured to store the first trace data in the trace buffer 66 at a current location indicated by the write pointer 68. In addition, the trace circuitry 64 is configured to modify the write pointer 68 to point to a next location in the trace buffer 66 and to modify the call depth counter 70 in a first direction. The first trace data may comprise information indicating details about the first event, a timestamp generated by the clock 82 and a current value of a program counter 84. For example, where the first event is a function call or a subroutine call, the first trace data may indicate a branch source address and a branch target address.

The trace circuitry 64 is also responsive to a second event encountered by the processing circuitry 62 in the sequence of instructions 86. In response to the second event, when the call depth counter 70 is not equal to the threshold call depth 72, the trace circuitry is configured to modify the call depth counter 70 in a first direction and to modify the write pointer 68 to point to a previous location in the trace buffer 66. In response to the second event, when the call depth counter 70 is equal to the threshold call depth 72, the trace circuitry 64 is configured to modify the underflow counter 74 and, optionally, to generate second trace data indicative of the second event and to store the second trace data in the trace buffer 66. In some embodiments the trace circuitry 64 is further configured to, when the call depth counter 70 is equal to the threshold call depth 72, to modify the write pointer 68 to point to the next location. In some embodiments the trace circuitry 64 is further configured to, when the call depth counter 70 is equal to the threshold call depth 72 and the underflow counter 74 is equal to the threshold underflow 76: modify the underflow counter 74, indicate in the second trace data a current value of the underflow counter 74 and to modify the write pointer 68 to point to the next location in the trace buffer 66. In addition, the trace circuitry 64 is configured to, when the call depth counter 70 is equal to the threshold call depth 72 and the underflow counter 74 is not equal to the threshold underflow 76: modify the underflow counter 74, modify the write pointer 68 to point to the previous location in the trace buffer 66, indicate in the second trace data the current value of the underflow counter 74 and to modify the write pointer 68 to point to the next location in the trace buffer 66. In embodiments in which second trace data is generated, the second trace data may comprise information indicating details about the second event, a timestamp generated by the clock 82 and a current value of a program counter 84. For example, where the second event is a function return or a subroutine return, the second trace data may indicate a branch source address and a branch target address.

In some embodiments, the trace buffer 66 may be split into a plurality of blocks 88, 90, 92 where each of the blocks 88, 90, 92 comprises a block store 98, 100, 102 to define metadata relating to the block 88, 90, 92. The block stores may comprise a base pointer 104, 190, 116 and a limit pointer 106, 112, 118 to define the size of the block 88, 90, 92; and a block offset 108, 114, 120 to determine a current write location in the block 88, 90, 92. It would be apparent to the skilled person that the block offset 108, 114, 120 could be replaced with data indicative of a location in a current block, and that the base pointers 104, 110, 116 and the limit pointers 106, 112, 118 could be replaced with any two of a base pointer 104, 110, 116; a limit pointer 106, 112, 118; and a block size. In the illustrated example shown in FIG. 5 there are N blocks. "Block 1" 88 comprises block store 98 which comprises base pointer 104, limit pointer 106 and block offset 108. "Block 2" 90 comprises block store 100, base pointer 110, limit pointer 112 and block offset 114. "Block N" 92 comprises block store 102, base pointer 116, limit pointer 118 and block offset 120.

In some embodiments the blocks 88, 90, 92 are configured to behave as circular buffers. In some embodiments the trace circuitry 64 may be configured to, when modifying the write pointer 68 to point to a next/previous location, modify the write pointer 68 to point to the next/previous block. In the illustrated example the write pointer 68 is pointing to "block 2" 90 where the address to which the write pointer points is determined by the current block offset 114 stored in the block store 100. This may be achieved in a number of ways. The write pointer 68 may be defined based on the block offset 108, 114, 120. Alternatively, the write pointer 68 may indicate a number of most significant bits of an address corresponding to an address range of the block 88, 90, 92 and the block offset 108, 114, 120 may provide a number of least significant bits of an address. The current location may therefore be defined by appending the block offset 88, 90, 92 to the write pointer 68. However it is defined, the write pointer 68 in the illustrated embodiment points to a current location in "block 2" 90 of the trace buffer 66. When the trace circuitry 64 determines that trace data is to be generated and written to the trace buffer 66, the block offset is increased by a predetermined size and the write pointer is modified to point to a next/previous block in the trace buffer. For example, in the illustrated embodiment the write pointer may be modified to point to a location in "block 1" 88 of the trace buffer 66, where the next/previous location in "block 1" 88 of the trace buffer 66 is determined based on the block offset 108 stored in the block store 98.

In addition the trace circuitry 66 may be responsive to a trigger event to reset the call depth counter 70 and the underflow counter 72. As discussed this enables the trace circuitry 64 to maintain a trace buffer 66 that contains trace data indicative of a number of first events and a number of second events that have occurred between a first trigger event and a second trigger event.

FIG. 6 shows a sequence of steps that are carried out by some embodiments of the present techniques. The steps carried out in FIG. 3 correspond to steps carried out by the data processing apparatus 10. The flow can be considered to start at step S60, where the data processing apparatus waits for a next instruction. Flow then proceeds to step S61, in which the trace circuitry 64 determines whether the instruction indicates a first event. If no, then the flow proceeds to step S62, where the trace circuitry 64 determines whether the instruction indicates a second event. If no, then the flow proceeds to step S63 to determine whether a trigger event has occurred. If no trigger event has occurred then the flow returns to step S60 to await the next instruction. If, at step S63, it is determined that a trigger event has occurred then flow proceeds to step S64 where a difference between the call depth counter 70 and the threshold call depth 72 is reset before flow proceeds to step S65. At step S65 the underflow counter 74 is reset to the threshold underflow 76 before the flow returns to step S60. If, at step S62 it is determined that the instruction corresponds to a second event then the flow proceeds to step S66, where it is determined whether the call depth counter 70 is equal to the threshold call depth 72. If yes, then the flow proceeds to step S67. At step S67 the trace circuitry 64 modifies the underflow counter 74 before proceeding to optional step S68 at which point the trace circuitry 64 generates second trace data indicative of the second event and stores the second trace data in the trace buffer 66 at the current location indicated by the write pointer 68. At steps S67 and S68 the current value of the write pointer may be maintained at a current value. Alternatively, at steps S67 and S68, the write pointer may be modified according to any of the schemes described above. Flow then returns to step S60 to await the next instruction. If, at step S66 it was determined that the call depth counter 70 was not equal to the threshold call depth 72 the flow proceeds to step S69. At step S69 the call depth counter 70 is modified in the second direction before flow proceeds to step S70 where the trace circuitry 64 modifies the write pointer 68 to point to a previous location in the trace buffer 66. Flow then returns to step S60 to await the next instruction. If, at step S61 the trace circuitry 64 determined that the instruction corresponded to a first event then flow proceeds to step S71. At step S71 the call depth counter 70 is modified in the first direction before flow proceeds to step S72. At step S72 the trace circuitry 64 generates first trace data indicative of the first event and stores the first trace data in the trace buffer 64 at the location determined by the write pointer 68. Flow then proceeds to step S73 where the write pointer 68 is modified to point to a next location in the trace buffer 64. Flow then returns to step S60 to await the next instruction.

FIG. 7 schematically illustrates trace data which may be stored in various example embodiments of the present techniques. Table 122 shows an illustrative sequence of events that may occur according to various example embodiments of the present techniques in which the flow diagram illustrated in FIG. 6 is describes the behaviour of the trace circuitry. In these example embodiments the first event is a function call and the second event is a function return. In these example embodiments the trace circuitry is configured to, in response to the first event, generate first trace data indicative of the first event and, in response to the second event, generate second trace data indicative of the second event. The trace circuitry is further responsive to the second event, when the call depth counter is equal to the threshold call depth and the underflow counter is equal to a threshold underflow, to: store second trace data indicative of a current value of the underflow counter; and modify the write pointer to point to the next location in the trace buffer, and wherein the trace circuitry is responsive to the second event, when the call depth counter is equal to the threshold call depth and the underflow counter is not equal to the threshold underflow, to: modify the write pointer to point to the previous location in the trace buffer; store second trace data indicative of a current value of the underflow counter; and modify the write pointer to point to the next location in the trace buffer. It is further assumed that the modification of the call depth counter in a first direction corresponds to incrementing the call depth counter and modifying the call depth counter in the second direction corresponds to decrementing the call depth counter. In addition it is assumed that the modification of the underflow counter corresponds to incrementing the underflow counter. Finally, in these example embodiments it is assumed that the threshold call depth and the threshold underflow are each equal to zero. It is noted however, that these assumptions are purely for the sake of illustration and that the described techniques could be applied to any form of modification and any first and second event as set out in the above description.

Table 122 shows the call-depth counter and the underflow counter that result from the event. Events marked with an asterisk (*) are events that are retained in the trace buffer 124.

At time T0 function func_1( ) calls function func_2( ) causing the call depth counter to be incremented from 0 to 1. As this is a first event, the underflow counter is not modified. This event causes first trace data to be generated and stored in the trace buffer 124 at location L0, where the first trace data is indicative of the function call from function func_1( ) to function func_2( ). In addition, the write pointer is modified to point to a next location L1 in the trace buffer 124.

At time T1 the function func_2( ) calls the function func 30 causing the call depth counter to be incremented from 1 to 2. As this is a first event, the underflow counter is not modified. This event causes first trace data to be generated and stored in the trace buffer 124 at location L1, where the first trace data is indicative of the function call from function func_2( ) to function func_3( ). In addition, the write pointer is modified to point to a next location L2 in the trace buffer 124.

At time T2 a trigger event occurs. This causes the call depth counter to be reset and the underflow counter (which is already at the threshold underflow) to be reset. The trace circuitry 64 is further responsive to the trigger event to store third trace data indicative of the trigger event at location L2 in the trace buffer 124. As a result the first trace data items generated at T0 and T1 and the third trace data generated at T2 are retained at locations L0, L1 and L2 respectively in the final trace buffer 124. In addition, the trace circuitry 64 modifies the write pointer to point to a next location L3 in the trace buffer.

At time T3 the function func_3( ) calls the function func_4( ) causing the call depth counter to be incremented from 0 to 1. As this is a first event, the underflow counter is not modified. This event causes first trace data to be generated and stored in the trace buffer 124 at the location L3, where the first trace data is indicative of the function call from function func_3( ) to function func_4( ). In addition, the write pointer is modified to point to a next location L4 in the trace buffer 124.

At time T4 a function return from function func_4( ) to func_3( ) occurs causing the call depth counter to be decremented. As the call depth counter was not equal to zero when the function return occurred the underflow counter remains at zero. The trace circuitry 64 is further configured to modify the write pointer to point to a previous location L3 in the trace buffer 124.

At time T5 a function return from function func_3( ) to function func_2( ) occurs. As the call depth counter is already zero it is not decremented further. Instead, the underflow counter is incremented from 0 to 1 and an indication of the underflow is generated by the trace circuitry 64 which is stored as part of second trace data in the trace buffer 124 at the location L3. In addition the write pointer is modified to point to a next location L4 in the trace buffer.

At time T6 function func_2( ) calls function func_5( ) causing the call depth counter to be incremented from 0 to 1. As this is a first event the underflow counter is not modified and remains set to 1. This event causes first trace data to be generated and stored in the trace buffer 124 at a location L4, where the first trace data is indicative of the function call from function func_2( ) to function func_5( ). In addition, the write pointer is modified to point to a next location L5 in the trace buffer 124.

At time T7 a function return from function func_5( ) to function func_2( ) occurs causing the call depth counter to be decremented. As the call depth counter was not equal to zero when the function return occurred the underflow counter remains at 1. In addition, the trace circuitry is configured to modify the write pointer to point to a previous location L4 in the trace buffer 124.

At time T8 a function return from func_2( ) to function func_1( ) occurs. As the call depth counter is already zero it is not decremented further. Instead, the underflow counter is incremented from 1 to 2. As the underflow counter is not equal to zero, the write pointer is modified to point to a previous location L3 in the trace buffer 124 and an indication of the underflow is generated by the trace circuitry 64 which is stored as part of second trace data in the trace buffer 124 at the location L3. Once this is done, the write pointer is modified to point to a next location L4 in the trace buffer.

At time T9 a function call from function func_1( ) to function func_5( ) occurs causing the call depth counter to increment from 0 to 1. As this is a first event, the underflow counter is not modified. This event causes first trace data to be generated and stored in the trace buffer 124 at a location L4, where the first trace data is indicative of the function call from function func_1( ) to function func_5( ). In addition, the write pointer is modified to point to a next location L5 in the trace buffer 124.

At time T10 a trigger event occurs. This causes the call depth counter to be reset and the underflow counter to be reset. The trace circuitry 64 is further responsive to the trigger event to store third trace data indicative of the trigger event at location L5 in the trace buffer 124. As a result the underflow count generated in response to the function return at T8, the first trace data item generated at T9, and the third trace data generated at T10 are retained at locations L3, L4 and L5 respectively in the final trace buffer 124. In addition, the trace circuitry 64 modifies the write pointer to point to a next location L6 in the trace buffer.

At time T11 a function return from function func_5( ) to function func_1( ) occurs. As the call depth counter is already zero it is not decremented further. Instead, the underflow counter is incremented from 0 to 1 and an indication of the underflow is generated by the trace circuitry 64 which is stored as part of second trace data in the trace buffer 124 at the location L6. Once this is done, the write pointer is modified to point to a next location L7 in the trace buffer.

At time T12 a function call from function func_1( ) to function func_2( ) occurs causing the call depth counter to be incremented from 0 to 1. As this is a first event, the underflow counter is not modified. This event causes first trace data to be generated and stored in the trace buffer 124 at a location L7, where the first trace data is indicative of the function call from function func_1( ) to function func_2( ). In addition, the write pointer is modified to point to a next location L8 in the trace buffer 124.

At time T13 a function call from function func_2( ) to function func_3( ) occurs causing the call depth counter to be incremented from 1 to 2. As this is a first event the underflow counter is not modified and remains set to 1. This event causes first trace data to be generated and stored in the trace buffer 124 at a location L8, where the first trace data is indicative of the function call from function func_2( ) to function func_3( ). In addition, the write pointer is modified to point to a next location L9 in the trace buffer 124.

At time T14 a function call from function func_3( ) to function func_4( ) occurs causing the call depth counter to be incremented from 2 to 3. As this is a first event the underflow counter is not modified and remains set to 1. This event causes first trace data to be generated and stored in the trace buffer 124 at a location L9, where the first trace data is indicative of the function call from function func_3( ) to function func 40. In addition, the write pointer is modified to point to a next location L10 in the trace buffer 124.

Based on the resulting trace buffer 124, it is possible to recreate the function call return stack 128 from the entries retained in the trace buffer 124. At time T2 the trace buffer 128 indicates that function func_1( ) has called func_2( ) and that function func_2( ) has called function func_3( ). Therefore at this time the call return stack comprises a stack of func_1( ) func_2( ) and func_3( ). At time T8, the trace buffer indicates an underflow of 2. This indicates that the call return stack at T10 is the same as the call return stack at T2 but with the top two entries removed. In addition at T9 the call return stack indicates that function func 10 has called function func_5( ). This indicates that the call return stack at T10 has a further entry of func_5( ). At the current time T14 the trace buffer 124 indicates that an underflow of 1 has occurred at T11, and at times T12, T13 and T14 function calls from func_1( ) to func_2( ), func_2( ) to func_3( ) and func_3( ) to func_4( ) have occurred. This indicates that the call return stack at T14 is the same as the call return stack at T10 but with the top entry removed and replaced with func_1( ) func_2( ) and func_3( ). In this way the call return stacks 128 can be constructed from the trace buffer 124.

FIG. 8 schematically illustrates a trace buffer which may embody various examples of the present techniques. The trace circuitry 64 comprises trace buffer 130. In some embodiments the trace buffer 130 may comprise a plurality of blocks 130(1), 130(2), . . . , 130(N). Each block 130(i), where i is any integer from 1 to N, may further comprise a plurality of sub-blocks 132(0), 132(1), 132(M). Each sub-block 132(j), where j is any integer from 1 to M may correspond to one of the first trace data, the second trace data or the third trace data. Each of the first, second and third trace data items may further comprise a number of data items 134(1), 134(2), . . . 134(P) corresponding to data indicative of the data processing activities before, around, or after the corresponding event. Each data item 134(k) where k is any integer from 1 to P may comprise a time stamp, a branch source address, a branch target address, a program counter, and any further items of data. The trace buffer 130, the blocks 130(i), and the sub-blocks 132(j) may be configured to behave as circular buffers as described in the above embodiments.

In brief overall summary a data processing apparatus and a method for processing data are disclosed. The data processing apparatus comprises: processing circuitry to process instructions; and trace circuitry comprising: a trace buffer; write pointer storage to store a write pointer to indicate a current location in the trace buffer; and a call depth counter to indicate a number of events, wherein the trace circuitry is configured to generate trace data indicative of processing activities of the processing circuitry, and in response to a first event to: modify the call depth counter in a first direction, store first trace data indicative of the first event in the trace buffer at the current location, and modify the write pointer to point to a next location in the trace buffer; in response to a second event, when the call depth counter is not equal to a threshold call depth, to: modify the call depth counter in a second direction and modify the write pointer to point to a previous location in the trace buffer; and in response to the second event, when the call depth counter is equal to the threshold call depth, to store second trace data indicative of the second event in the trace buffer at the current location.

FIG. 9 schematically illustrates the layout of a trace buffer which may embody various examples of the present techniques. The trace buffer 200 is split into a plurality of blocks 140, 142, 144. In this example the trace buffer 200 is split into three blocks which are each 1024 bytes in size. Each block 140, 142, 144 comprises a block store 146, 148, 150 which stores a current block. The current base is a known offset above the current block base. In this example the current base is 16 bytes above the current block base. The current block 142 is defined by at least two of a current block base, a current block limit, and a block size.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
  processing circuitry configured to process instructions; and
  trace circuitry comprising:
    a trace buffer;
    write pointer storage configured to store a write pointer to indicate a current location in the trace buffer; and
    a call depth counter configured to indicate a number of events, wherein the trace circuitry is configured to generate trace data indicative of processing activities of the processing circuitry, and
    in response to a first event, the trace circuitry is configured to: modify the call depth counter in a first direction, store first trace data indicative of the first event in the trace buffer at the current location, and modify the write pointer to point to a next location in the trace buffer;

in response to a second event, when the call depth counter is not equal to a threshold call depth, the trace circuitry is configured to: modify the call depth counter in a second direction and modify the write pointer to point to a previous location in the trace buffer; and
in response to the second event, when the call depth counter is equal to the threshold call depth, the trace circuitry is configured to store second trace data indicative of the second event in the trace buffer at the current location, and
wherein the trace circuitry is configured to be responsive to a trigger event to reset a difference between the call depth counter and the threshold call depth.

2. The data processing apparatus of claim 1, wherein the trace circuitry is configured to, when resetting the difference between the call depth counter and the threshold call depth to zero, one of:
reset the call depth counter to the threshold call depth; and
set the threshold call depth to the call depth counter.

3. The data processing apparatus of claim 1,
wherein the trace circuitry is configured to be responsive to the trigger event to store third trace data indicative of the trigger event in the trace buffer, and to modify the write pointer to point to a next location in the trace buffer.

4. The data processing apparatus of claim 1, wherein the trace circuitry is configured to be responsive to the trigger event to generate and store additional information indicative of the processing activities of the processing circuitry.

5. The data processing apparatus of claim 4, further comprising statistical profiling circuitry configured to sample processing information relating to a current instruction, wherein the additional information indicative of the processing activities of the processing circuitry is generated based on the processing information sampled by the statistical profiling circuitry.

6. The data processing apparatus of claim 1, wherein the trace circuitry is configured to be responsive to the second event, when the call depth counter is equal to the threshold call depth, to modify the write pointer to point to the next location in the trace buffer.

7. The data processing apparatus of claim 1, wherein the trace buffer further comprises an underflow counter, and
wherein the trace circuitry is configured to be responsive to the second event, when the call depth counter is equal to the threshold call depth, to modify the underflow counter.

8. The data processing apparatus of claim 7, wherein the trace circuitry is configured to be responsive to the second event, when the call depth counter is equal to the threshold call depth and the underflow counter is equal to a threshold underflow, to:
store second trace data indicative of a current value of the underflow counter; and
modify the write pointer to point to the next location in the trace buffer, and
wherein the trace circuitry is configured to be responsive to the second event, when the call depth counter is equal to the threshold call depth and the underflow counter is not equal to the threshold underflow, to:
modify the write pointer to point to the previous location in the trace buffer;
store second trace data indicative of a current value of the underflow counter; and
modify the write pointer to point to the next location in the trace buffer.

9. The data processing apparatus of claim 8, wherein the trace circuitry is configured to be responsive to the trigger event to reset the underflow counter to the threshold underflow.

10. The data processing apparatus of claim 7, wherein the trace circuitry is configured to be responsive to the trigger event to store third trace data indicative of the trigger event in the trace buffer, and to modify the write pointer to point to a next location in the trace buffer, and
wherein the trace circuitry is responsive to the trigger event to indicate, in the third trace data, a current value of the underflow counter.

11. The data processing apparatus of claim 1, wherein the trace data is configured for storage as a packet of trace data of a predetermined size.

12. The data processing apparatus of claim 11, wherein the trace buffer is divided into a plurality of blocks and each block of the plurality of blocks has a block size defined by a block base and a block limit,
wherein the block size is an integer multiple of the predetermined size,
wherein the current location is a location in a current block of the plurality of blocks, and
wherein the trace circuitry is configured to be responsive to trace data being stored to the current block to increment the location in the current block by the predetermined size.

13. The data processing apparatus of claim 12, wherein each of the blocks of the plurality of blocks is divided into a plurality of sub-blocks, and
wherein each of the sub-blocks has a sub-block size defined as an integer multiple of the predetermined size.

14. The data processing apparatus of claim 13, wherein the sub-block size is the predetermined size;
wherein the trace data comprises a plurality of trace items sequentially written to a current sub-block of a current block,
wherein the current location is defined based on a location of the current sub-block and a current sub-block offset, and
wherein the trace circuitry is configured to be responsive to the current sub-block offset being greater than or equal to the sub-block size to reset the current sub-block offset to zero.

15. The data processing apparatus of claim 14, wherein the trace circuitry is configured to be responsive to the first event to perform one of:
storage of the plurality of trace items in the current sub-block;
storage of a number of further trace items to the current sub-block prior to modifying the write pointer, wherein the number of further trace items corresponds to a fraction of the predetermined size; and
storage of the number of further trace items to the current sub-block prior to modifying the write pointer, wherein the number of further trace items corresponds to the predetermined size.

16. The data processing apparatus of claim 14, wherein the trace circuitry is configured to be responsive to the second event, when the call depth counter is not equal to the threshold call depth, to perform one of:
storage of the plurality of trace items in the current sub-block;
storage of a number of further trace items to the current sub-block prior to modifying the write pointer, wherein the number of further trace items corresponds to a fraction of the predetermined size; and storage of the number of further trace items to the current sub-block prior to modifying the write pointer, wherein the number of further trace items corresponds to the predetermined size.

17. The data processing apparatus of claim 1, wherein the trace data is configured for storage as a packet of trace data and a size of the packet of trace data is indicated in the trace data.

18. The data processing apparatus of claim 1, wherein the first event is one of a plurality of first events comprising at least one of a subroutine call and an exception event, and
    wherein the second event is one of a plurality of second events comprising at least one of a subroutine return and an exception return event.

19. A method of storing trace data in a trace buffer comprising:
    processing instructions;
    generating the trace data indicative of the processing;
    in response to a first event:
    modifying a call depth counter in a first direction;
    storing first trace data indicative of the first event in the trace buffer at a current location defined by a write pointer; and
    modifying the write pointer to point to a next location in the trace buffer; and
    in response to a second event and when the call depth counter is not equal to a threshold call depth:
    modifying the call depth counter in a second direction; and
    modifying the write pointer to point to a previous location in the trace buffer; and
    in response to the second event and the call depth counter being equal to the threshold call depth, storing second trace data indicative of the second event in the trace buffer at the current location, and
    resetting, in response to a trigger event, a difference between the call depth counter and the threshold call depth.

* * * * *